United States Patent [19]
White

[11] Patent Number: 5,062,506
[45] Date of Patent: Nov. 5, 1991

[54] ROTARY DRUM BRAKE ASSEMBLY BRACKET

[75] Inventor: Jay D. White, Galesburg, Mich.

[73] Assignee: Eaton Corporation, Cleveland, Ohio

[21] Appl. No.: 564,274

[22] Filed: Aug. 8, 1990

[51] Int. Cl.$^5$ ............................................. F16D 51/20
[52] U.S. Cl. .................................. 188/329; 188/106 A
[58] Field of Search ................................ 188/327–330, 188/332, 341, 325, 326, 343, 106 A; 267/179

[56] References Cited

U.S. PATENT DOCUMENTS

| | | | |
|---|---|---|---|
| 1,728,384 | 9/1929 | Whitworth | 188/330 |
| 2,013,595 | 9/1935 | Barnard | 267/179 X |
| 2,185,324 | 1/1940 | Baisch | 188/327 X |
| 2,265,999 | 12/1941 | Cadman | 188/326 X |
| 3,061,051 | 10/1962 | Swift | 188/326 X |
| 4,555,001 | 11/1985 | Roberts | 267/179 X |

FOREIGN PATENT DOCUMENTS

698457 10/1953 United Kingdom ................ 188/328

*Primary Examiner*—Robert J. Oberleitner
*Assistant Examiner*—Alfred Muratori
*Attorney, Agent, or Firm*—A. E. Chrow

[57] ABSTRACT

An anchor bracket (100) is provided for securing return springs (36) and (36') in close proximity to a cam (32) of a rotary drum brake assembly (200). Bracket (100) has an inverted "U" type configuration comprising a bridging portion (40) from opposite sides of which extend legs (42) and (42') that are spaced apart from each other and have a height sufficient to enable the close proximity between cam (32) and bracket (100) that operates to increase mechanical advantage in enabling return springs (36) and (36') to move a pair of brake shoe assemblies (20) and (20') towards each other upon release of the brakes by an operator.

10 Claims, 2 Drawing Sheets

ROTARY DRUM BRAKE ASSEMBLY BRACKET

RELATED APPLICATIONS

This application is related to Ser. No. 515,899, filed Apr. 27, 1990 assigned to the Assignee of this application.

INTRODUCTION

This invention relates generally to a cam actuated, pivoted shoe type rotary drum brake assembly and more particularly to a vehicular rotary drum brake assembly that utilizes an anchor bracket for securing one end of each of a pair of coiled return springs or the like whose opposite ends are secured to respective brake shoe assemblies and are operative to urge the brake shoe assemblies inwardly towards each other for a distance sufficient to disengage the brakes when the brake is released.

BACKGROUND OF THE INVENTION

Rotary drum brake assemblies are well known in the art of braking motor vehicle wheels. Such assemblies characteristically include a stationary backing or torque plate secured to the end of the axle and about which rotates a rotary drum to which the wheel is secured. The brake assembly features a pair of opposed brake shoe assemblies that are respectively pivotally mounted at one end to the backing plate within the drum and carry frictional braking material facing theretowards. Upon application of the brakes, a mechanism such as a rotary or a wedge cam disposed between the opposite end of the brake shoe assemblies, is caused to rotate or to be axially displaced and spread the brake shoe assemblies apart for a distance sufficient to enable the braking material to frictionally engage the drum for the braking thereof.

At least one and often two or more resilient biasing members such as coiled springs (usually called "return springs") are employed to resiliently urge the brake shoe assemblies towards each other for a distance sufficient to disengage the frictional braking material from the drum upon release of the brake.

Examples of rotary drum brake assemblies and the various means employed to secure the biasing members so that they operate in the manner described above are disclosed in U.S. Pat. Nos. 2,064,103; 2,751,048; 2,788,866; 3,837,446; 4,064,978 and 4,216,850, the disclosures of all of which are incorporated herein by reference.

All of the above disclosed brake shoe assemblies that are secured directly between both of the brake shoe assemblies or are otherwise unable to be disposed in close proximity to the cam so as to increase the mechanical advantage obtained thereby for pivoting the brake shoe assemblies towards each other upon release of the brake. The anchor bracket of the present invention not only provides additional clearance for steer hubs but also eliminates the practice of heretofor having to trim off the tip of the rotary cam in order to obtain return spring clearance which has the adverse effect of reducing cam reserve i.e. the amount of extra rise in the cam operable to prevent the cam from flipping over when the brake shoe assemblies are spread by the cam to the maximum separation distance between them.

SUMMARY OF THE INVENTION

Accordingly, it is an object of this invention to provide an anchor bracket for securement of springs and the like that are operative in a rotary drum brake assembly to disengage the brakes upon the release of the brake.

It is another object of this invention to provide an anchor bracket for use in a rotary drum brake assembly that is simple in design and able to be easily installed for enabling return springs and the like to disengage the brakes upon the release thereof.

It is still another object of this invention to provide a bracket for securing return springs and the like to the brake shoe assemblies that is inexpensive and easy to install and is able to be disposed in close proximity to the cam and thereby increase mechanical advantage for preventing the brake shoe assemblies towards each other upon release of the brake as well as providing additional clearance for steer hubs in addition to eliminate post practice of cam tip trimming.

DESCRIPTION OF SOME PREFERRED EMBODIMENTS

Figure 1:
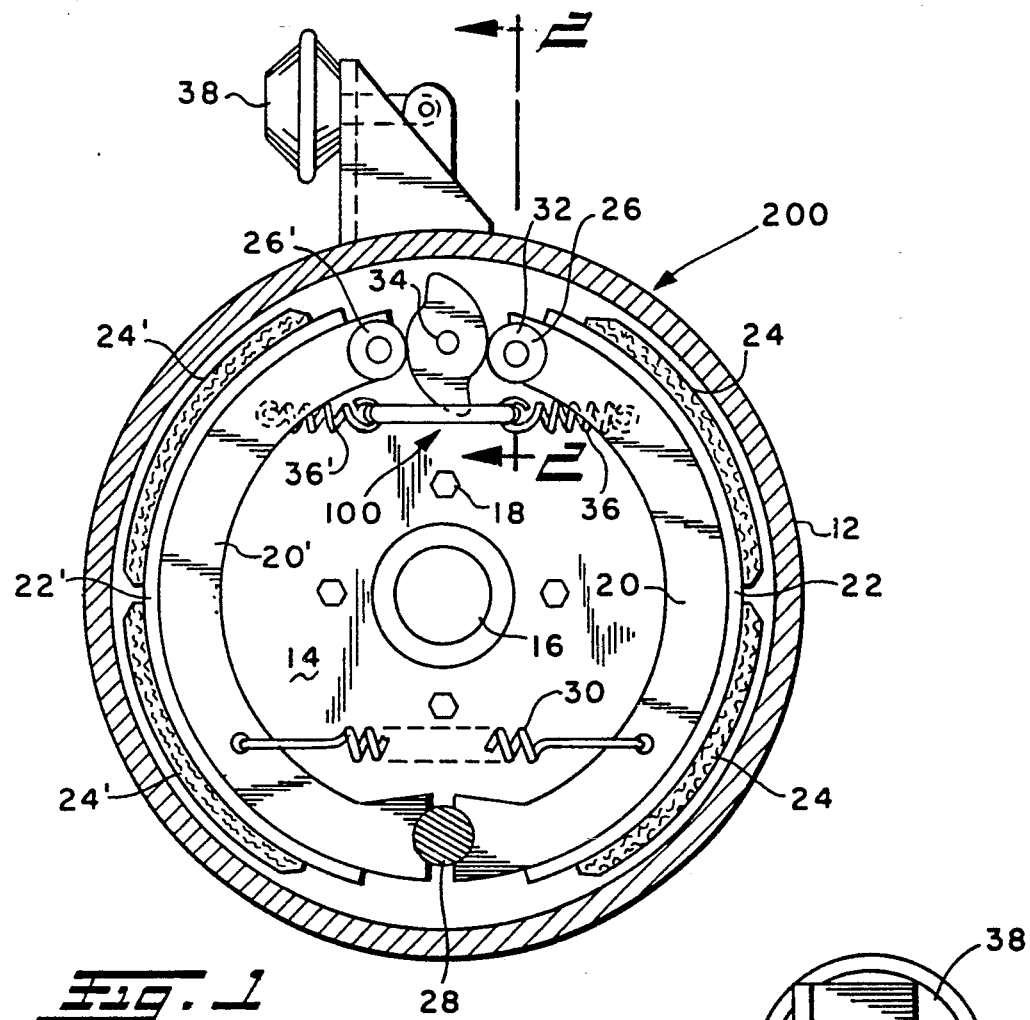
FIG. 1 is a front view of a vehicular rotary brake drum assembly 200.

Brake shoe assembly of FIG. 1 comprises a backing plate or spider 14 secured by means such as bolts 18 to the stationary section of a vehicular axle end 16 having a rotary brake drum 12 that rotates with the wheel and is frictionally braked to slow or stop the wheel when the brakes are applied by the operator.

Assembly 200 comprises a pair of opposed arcuate brake shoe assemblies 20 and 20' that are pivotally mounted at one end on stationary pin 28 by suitable means such as coiled tension spring 30 connected directly between brake shoes 20 and 20; near pin 28 as shown in FIG. 1.

Figure 2:
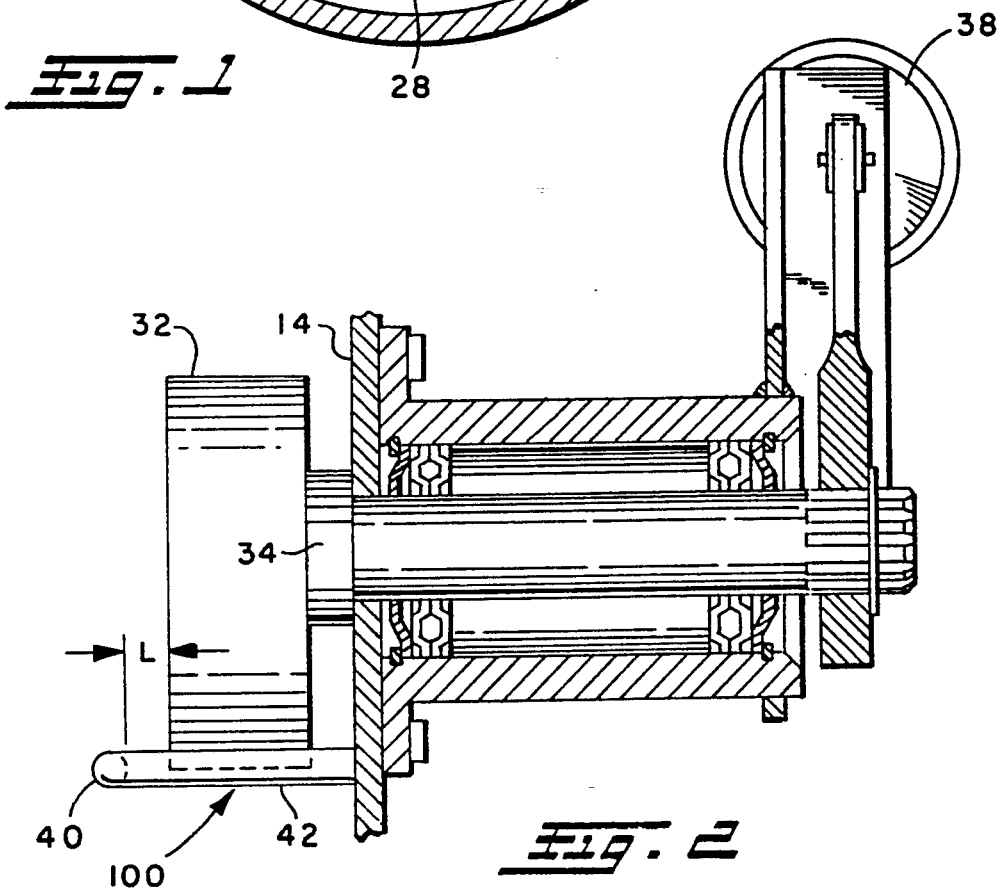
FIG. 2 is a side view of assembly 200 of FIG. 1 taken along view line 2—2.

A rotary actuator, commonly in the form of a shaft 34, extends through an opening in backing plate 14. As shown in FIG. 2, shaft 34 has a rotary "S" cam well known in the art secured at its end.

Brake shoe assemblies 20 and 20'; respectively carry cam roller followers 26 and 26' at their opposite ends that respectively engage cam 32 and cause assemblies 20 and 20' to pivot away from each other when cam 32 is caused to rotate such as by means of pressurized fluid in chamber 38 when the brakes are applied by the operator.

Brake shoe assemblies 20 and 20' include arcuate plates 22 and 22' respectively that have pads of suitable frictional braking material 24 and 24' suitably secured thereto that frictionally brake rotary drum 12 when cam 32 rotates to pivot assemblies 20 and 20' away from each other sufficiently to cause engagement of frictional material 24 and 24' with rotary drum 12 when the brakes are applied by the operator. Although not shown in FIG. 2, brake shoe assemblies 20 and 20' commonly include a pair of spaced apart arcuate webs or ribs that respectively support plates 22 and 22'.

It has been common practice in the past to employ a return spring that is operative to urge the brake shoe assemblies back towards each other for a distance sufficient to disengage frictional material 24 and 24' from rotary drum 12 when the brakes are released by the operator.

As can readily be seen in FIG. 1, the closer the return spring is to cam 32, the greater the mechanical advantage in pivoting assemblies 20 and 20' back towards each other upon release of the brakes.

Figure 3:
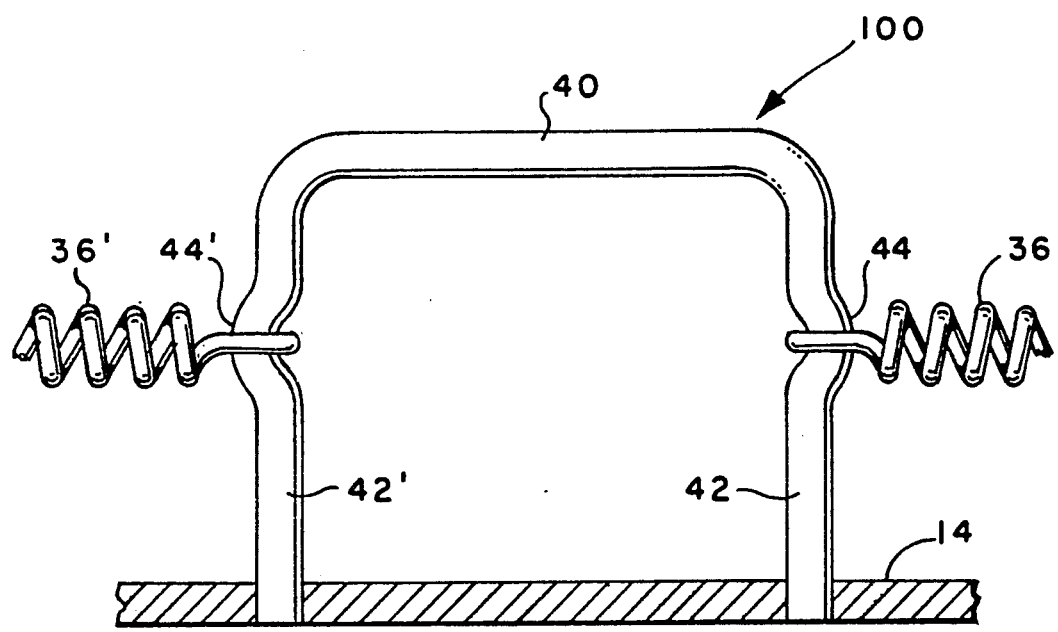
FIG. 3 is a side view of a preferred embodiment of an anchor bracket 100 used in the assembly of FIGS. 1 and 2.

The present invention provides for an anchor bracket 100 having an inverted "U" type configuration as shown in FIG. 3.

Bracket 100 has a pair of spaced apart legs 42 and 42' that extend from opposite sides of a bridging portion 40 and are respectively suitably secured in substantially transverse relationship to backing plate 14 such as by being received through openings in backing plate 14.

Legs 42 and 42' have a height and are spaced apart from each other for a distance sufficient to enable bracket 100 to be disposed in closer proximity to cam 32. Preferably, legs 42 and 42' have a height that enables bridging portion 42 to exceed the height of cam 2 from backing plate 14 by a predetermined distance "L" as shown in FIG. 2 and are spaced apart from each other for a distance sufficient to enable at least a portion of cam 32 to be straddled by bracket 100 as shown in FIG. 1.

Legs 42 and 42' include means for securing one end of resilient braking means such as coiled springs 36 and 36' respectively thereto. As shown in FIG. 3, the securement means preferably comprises an arcuate wave or dimple 44 and 44' in legs 42 and 42' respectively.

Dimples 44 and 44' are respectively adapted to enable one end of springs 36 and 36' to be secured thereat to legs 42 and 42' with the opposite ends of springs 36 and 36' being secured to brake assemblies 20 and 20' respectively.

As can be seen in FIG. 1, bracket 100 enables springs 36 and 36' to be secured to brake shoe assemblies 20 and 20' in close proximity to rotary "S" cam 32 without inhibiting its rotation with the advantage of enhancing the mechanical advantage in enabling springs 36 and 36' to resiliently urge brake shoe assemblies towards each other as they pivot about pin 28 upon release of the brakes.

Anchor bracket 100 is preferably made from a suitable steel wire that is formed into the "U" type configuration from wire having a diameter suitable to provide the strength required to withstand the force exerted thereupon by springs 36 and 36' in addition to enabling switch securement to backing plate 14 by press fit, welding or loose fit with tapered holes or other suitable securement means.

The use of wire to provide the inverted "U" wire form type configuration shown in FIG. 3 additionally enables the formation of arcuate waves or dimples 44 and 44' with relative ease.

What is claimed is:

1. An anchor bracket for a brake assembly, which brakes a rotary drum, said brake assembly of the type comprising:
    a stationary backing plate,
    a pair of opposed brake shoes assemblies respectively having opposite ends with one end pivotally secured to the stationary plate and carrying a frictional braking material facing towards the drum,
    a cam disposed between the opposite ends of the brake shoe assemblies and mounted on a rotary shaft and operative to rotate and urge the brake shoe assemblies away from each other and cause the frictional braking material to engage the drum upon actuation of the brake, and
    biasing means respectively having one end secured to each brake shoe assembly and an opposite end secured to the bracket, said bracket having an inverted "U" type configuration comprising a pair of legs extending from opposite sides of a bridging portion,
    said legs respectively secured in substantial transverse relationship to the backing plate, said bridging portion having a height above the cam, and said legs spaced apart from each other for a distance sufficient to enable the bracket to be disposed in close proximity to the cam, and
    said legs respectively provided with means for securing the opposite ends of the biasing means thereto in such a manner as to enable the biasing means to urge the brake shoe assemblies towards each other upon release of the brake.

2. The bracket of claim 1, wherein the inverted "U" shaped configuration is an inverted "U" shaped wire form configuration.

3. The bracket of claim 1 wherein the means for securing the biasing means opposite ends to the bracket legs comprises an arcuate wave in each leg.

4. The bracket of claim 1 wherein the bracket straddles at least a portion of the cam.

5. The bracket of claim 1 wherein the biasing means are coiled tension springs.

6. A brake assembly for braking a rotary drum, said brake assembly comprising:
    a stationary backing plate;
    a pair of opposed brake shoe assemblies respectively having opposite ends with one end pivotally secured to the stationary plate and carrying a frictional braking material facing towards the drum;
    an actuating cam disposed between the opposite ends of the brake shoe assemblies, said cam mounted on an actuating member and operative to urge said brake shoe assemblies away from each other and cause the frictional braking material to engage the drum upon actuation of the brake,
    an anchor bracket secured to the backing plate; and
    biasing means respectively having one end secured to each brake shoe assembly and an opposite end secured to the anchor bracket;
    said bracket having an inverted "U" type configuration comprising a pair of legs extending from opposite sides of a bridging portion, said legs respectively secured in substantial transverse relationship to the backing plate, said bridging portion having a height above the cam, said legs spaced apart from each other for a distance sufficient to enable the bracket to be disposed in close proximity to the cam; and
    said legs respectively provided with means for securing the opposite ends of the biasing means thereto in such a manner as to enable the biasing means to urge the brake shoe assemblies towards each other upon release of the brake.

7. The assembly of claim 6 wherein the inverted "U" type configuration is an inverted "U" type wire form configuration.

8. The assembly of claim 6 wherein the bracket straddles at least a portion of the cam.

9. The assembly of claim 6 wherein the means for securing the biasing means opposite ends to the bracket legs comprises an arcuate wave in each leg.

10. The assembly of claim 6 wherein the biasing means are coiled springs.

* * * * *